United States Patent [19]

Margraf

[11] Patent Number: 4,622,052
[45] Date of Patent: Nov. 11, 1986

[54] STRATIFIED BULK MATERIAL FILTER

[76] Inventor: Adolf Margraf, Am Schleplingsbach 46, 3060 Stadthagen, Fed. Rep. of Germany

[21] Appl. No.: 766,265

[22] Filed: Aug. 16, 1985

[30] Foreign Application Priority Data

Sep. 19, 1984 [DE] Fed. Rep. of Germany ....... 3434310

[51] Int. Cl.$^4$ ............................................. B01D 46/00
[52] U.S. Cl. ............................................ 55/479; 55/99
[58] Field of Search ................... 55/98, 99, 90, 282, 55/302, 474, 479, 512

[56] References Cited

U.S. PATENT DOCUMENTS 3,716,969  2/1973  Maeda .................................. 55/479

FOREIGN PATENT DOCUMENTS 36516    2/1984  Japan ..................................... 55/479
2119675  11/1983  United Kingdom .................. 55/474

Primary Examiner—Bernard Nozick
Attorney, Agent, or Firm—Balogh, Osann, Kramer, Dvorak, Genova & Traub

[57] ABSTRACT

Within its dust gas space, the stratified bulk material filter receives the layers of bulk material which are bordered at either side by delimitations, may be traversed transversely by a flow of flue gas or dust gas, and which are combined in pairs to define a purified gas flow departure space connected to the purified gas side, situated between them. Upon installing the bulk material layer delimitations, the delimitations are first inserted into the dust gas space from the purified gas side at the flow arrival side of the bulk material layers and are immovably suspended therein on bearers of the end sides of each pair of bulk material layers, whereupon gas-permeable delimitations are inserted from the purified gas side to establish the delimitations at the flow departure sides and are suspended by their extremities on the end sides of each pair of bulk material layers, then the spaces between the delimitations at the flow arrival and flow departure sides are charged with bulk material.

8 Claims, 7 Drawing Figures

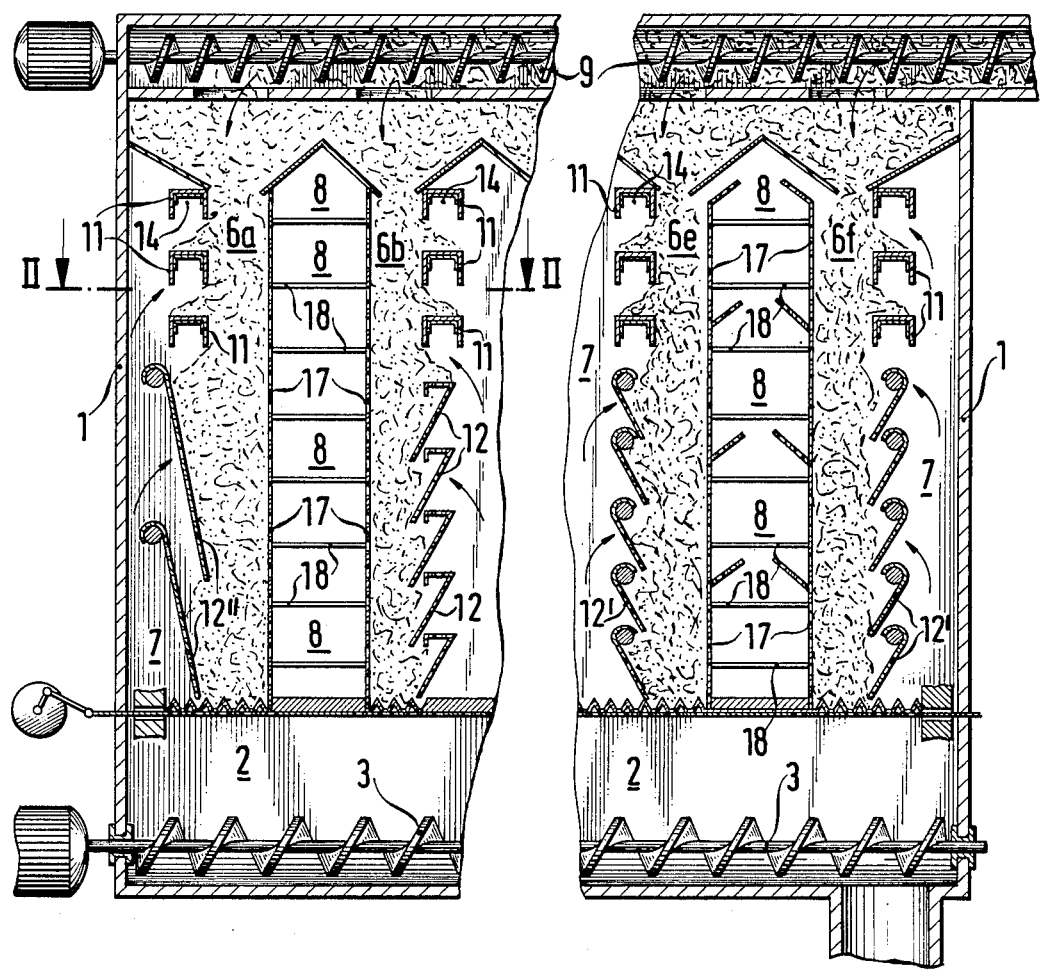
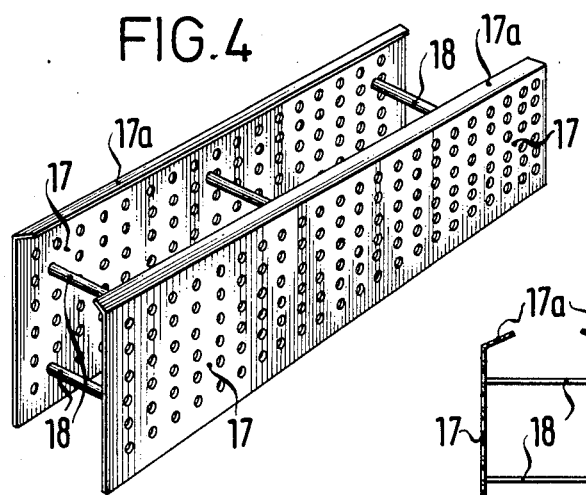
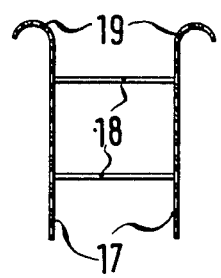

STRATIFIED BULK MATERIAL FILTER

BACKGROUND OF THE INVENTION

1. Field of the Invention

The invention relates to a stratified bulk material filter having a bottom collector space within a housing which is subdivided by a partition into a dust gas space comprising at least two upright bulk material layers combined into pairs in each case, provided with lateral delimitations and traversed transversely by a flow of flue gas or dust gas, and a purified gas space which is connected to the flow departure space between the two bulk material layers of each pair of layers via a partition opening extending from top to bottom in each case.

2. Description of the Prior Art

In known filters of the above kind, filter capacity is limited by the number of layers which in turn is limited by the size of the housing.

OBJECTS AND SUMMARY OF THE INVENTION

The object of the invention consists in providing the dust gas space in the aforesaid stratified bulk material filters with a maximum number of bulk material layers for improved space exploitation whilst simultaneously rendering the installation of the opposite lateral delimitations of the bulk material layers particularly simple. In the case of the aforesaid stratified bulk material filter, this problem is resolved according to the invention by providing that the lateral gas-permeable delimitation means of each bulk material layer at the flow arrival and flow departure sides consists of rigid gas-permeable delimiting members extending between opposite sides which may be inserted into the flow departure space of each bulk material layer pair from the purified gas space, and may be suspended therein by their extremities on bearers at the partition and at the oppositely situated terminal wall of each pair of bulk material layers in firmly retained manner.

As a result, the delimitation means of each bulk material layer may be passed from the purified gas space through comparatively narrow and corresponding flow departure spaces between the layers of each pair of bulk material layers and screwed joints or fixed joints may be avoided, furthermore seals are not necessary and the number of the layers of bulk material in the dust gas space may be increased substantially.

The delimiting strips are thus inserted at the two flow arrival sides of each pair of bulk material layers through the partition openings between the two layers of bulk material of one pair of an optional number of pairs into the dust space from the purified gas side and suspended by the upper extremities, and this is followed by the insertion and suspension of the delimitations at the flow departure side of each pair of bulk material layers in identical manner. After all the delimitations have been installed, the bulk material is introduced into the spaces formed between the delimitations.

BRIEF DESCRIPTION OF THE DRAWINGS

The invention will now be described, by way of example, with reference to the accompanying partly diagrammatic drawings, in which:

FIG. 1 is a vertical fragmented longitudinal cross-section through a stratified bulk material filter.

FIG. 4 is an enlarged illustration in perspective of a channel for forming the flow departure space between two layers of a filter, and FIGS. 5 and 6 are diagrammatic cross-sections through a flow departure channel with alternative arrangement of the top edges of the delimiting sidewalls of a filter according to the invention.

DETAILED DESCRIPTION OF THE PREFERRED EMBODIMENT

Figure 2:
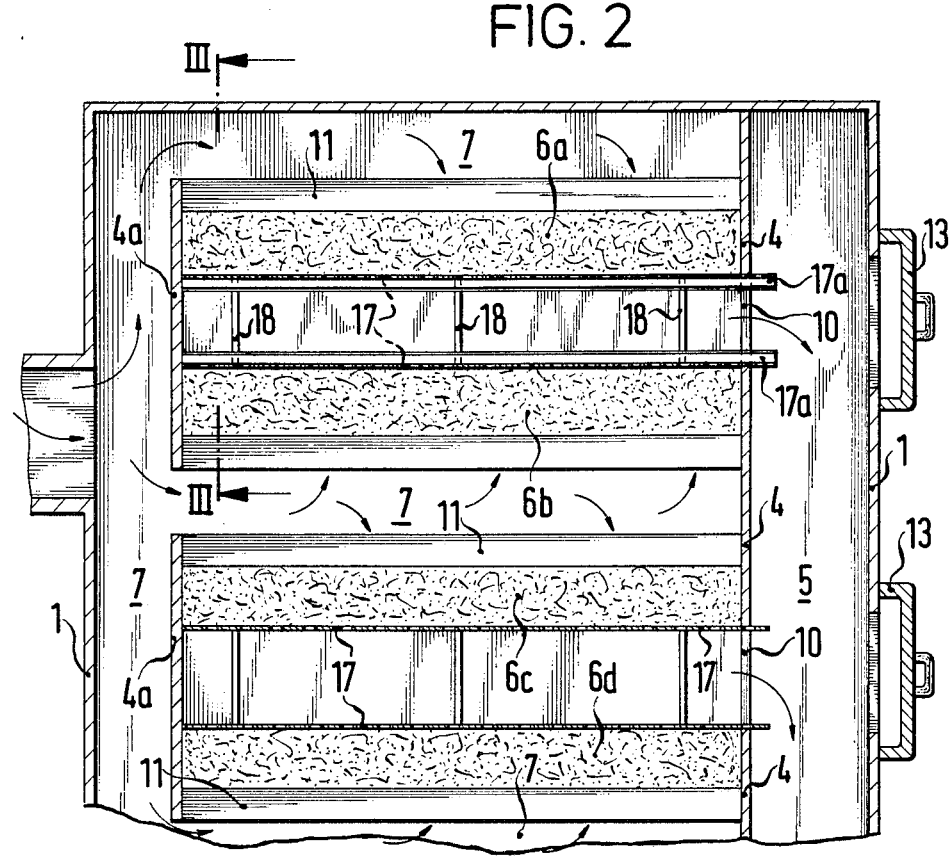
FIG. 2 is a partial horizontal cross-section along the line II—II of FIG. 1.

In known manner and referring more particularly to FIGS. 1 and 2, the stratified bulk material filter comprises a housing 1 having a bottom collector space 2 and an extractor conveyor 3 and is subdivided by a partition 4 into a purified gas space 5 connected to a suction fan, and the dust gas space 7 within which are received upright pairs of bulk material layers $6a,6b$; $6c,6d$ and $6e,6f$ and acted upon by flue gas or dust gas, which is fed to the flue or dust gas space 7. Two bulk material layers $6a,6b$ etc., are combined into a pair and between them they form a purified gas flow departure space 8 in communication with the purified gas space 5. The bulk material layers 6 are closed off at the one end side by the partition 4 from the purified gas space 5 and the flow arrival side of the flue gases, and at the oppositely situated end side, the two layers of bulk material and the flow departure space 8 are closed off from the supply of flue gas by the side plates $4a$ oppositely situated to the partition 4, as shown in FIG. 2. The bulk material layers 6 of each pair are traversed transversely by the flow of flue gas, and the flue gas is drawn off between the two layers 6 via the flow departure space 8 between them and the purified gas space 5. The layers of bulk material 6 are charged with bulk material from the top, from a stock, not illustrated, by means of a screw conveyor 9 or the like, as apparent from FIG. 1.

So that the housing may be exploited in a space-saving manner according to the invention, a maximum number of bulk material layers 6 should be stowed in the dust gas space 7 in parallel alignment and with as narrow as possible a flow departure space between the layers 6 of each pair of bulk material layers, to which end however, the assembling operation should not be impeded by narrow spaces. For this reason, the partition 4 is provided with comparatively narrow excisions or apertures 10 extending at intervals from top to bottom between adjacent pairs of bulk material layers. These excisions 10 have a width for example of 2000 mms in practice.

The installation of means forming delimitations of the bulk material layers is performed through the excisions 10. To this end, the delimitation means at the flow arrival side of each layer 6 may be constructed differently.

Figure 3:
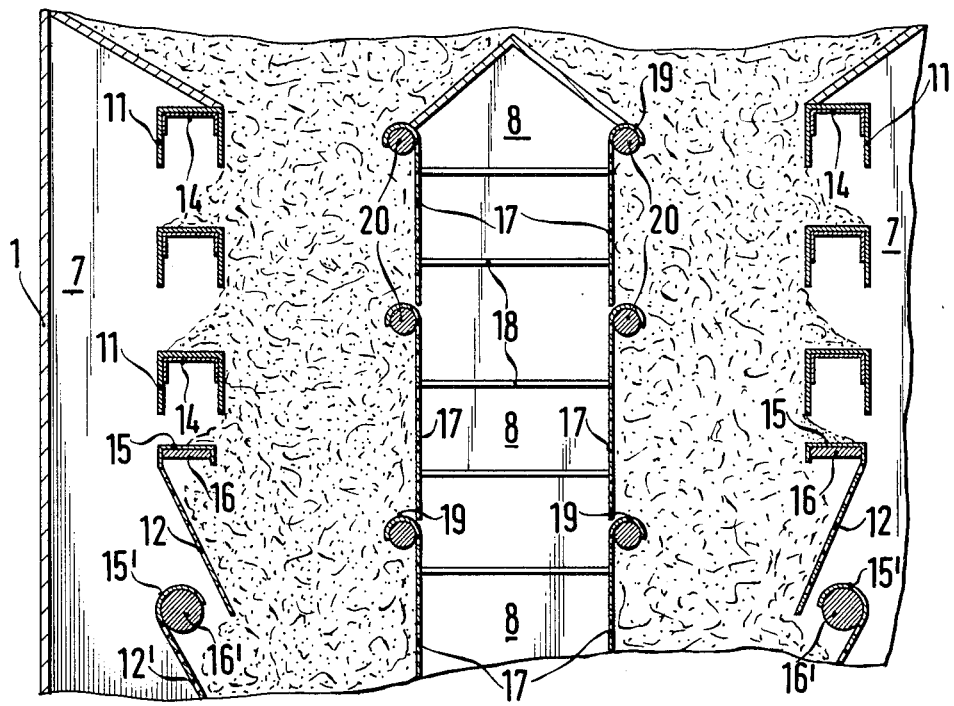
FIG. 3 shows a partial vertical cross-section along the line III to III of FIG. 2 to a slightly enlarged scale.

In accordance with one example, the delimitations comprise downwardly open U sections 11 or perforated or sieve plates 12 (FIGS. 1 and 3). The U sections 11 are so installed that a bulk material may form above the web of each section 11 as shown. The sieve plates 12 which may be utilised have an oblique position in downwardly and inwardly inclined manner and overlap each other a little with mutual spacing. If U sections 11 are used for the delimitations at the flow arrival side of the layers 6, the U sections 11 are inserted into the dust gas space 7 via ports 13 in the housing 1, through the purified gas space 5 and the partition apertures 10 (FIG. 2). They have their extremities positioned and supported on—for example U shaped—bearers 14 on the end sides 4 and 4a of each pair of bulk material layers, so that they are retained against displacement due to their sectional shape.

If sieve plates 12 are used as delimitations of the layers 6 at the flow arrival side, these are also inserted into the dust gas space via the partition openings 10 and have upper sectional extremities 15 suspended over bearers 16 in the form of pegs or the like, which are secured on the end sides 4 and 4a, as is apparent from FIGS. 1 and 3, so that a displacement of the sieve plates 12 cannot occur.

The delimitations of the bulk material layers at the flow departure side are finally installed. According to the example in FIGS. 1, 2, 3, 4 and 5, these delimitations comprise channels having two parallel and gas-permeable perforated walls 17, which are held at fixed distances from each other by means of bearers, e.g. bars 18.

As illustrated in perspective in FIG. 4 and enlarged in cross-section in FIGS. 5 and 6, the channels match the width of the partition apertures 10 so that they may be inserted into the dust gas space 6 through these openings (10) and between them form a flow departure space 8 for filtered gas. The bulk material is thereupon charged between the delimitations at the flow arrival and departure sides from above, so that a filtration of flue gas or dust gas may now be performed. The channels 17,18 are secured against displacement at their extremities by means of lateral stops on the end side 4a. A displacement of the channels at the side of the purified gas space 5 may be prevented by the fact that the channels have their sidewalls 17 projecting a little into the purified gas space. If the perforated sides are bent over outwards along the top edge according to FIG. 5, these edge sections 19 may be utilised to suspend the channel extremities on the end side 4 via studs 20 (FIG. 3), to secure their position. Folded edge portions 17a (FIG. 6) or the sections 19 may form a reinforcement of the perforated sides against the side pressure of the bulk material and also act as bearers for the flow departure channel which is to be inserted above the same.

Figure 3A:
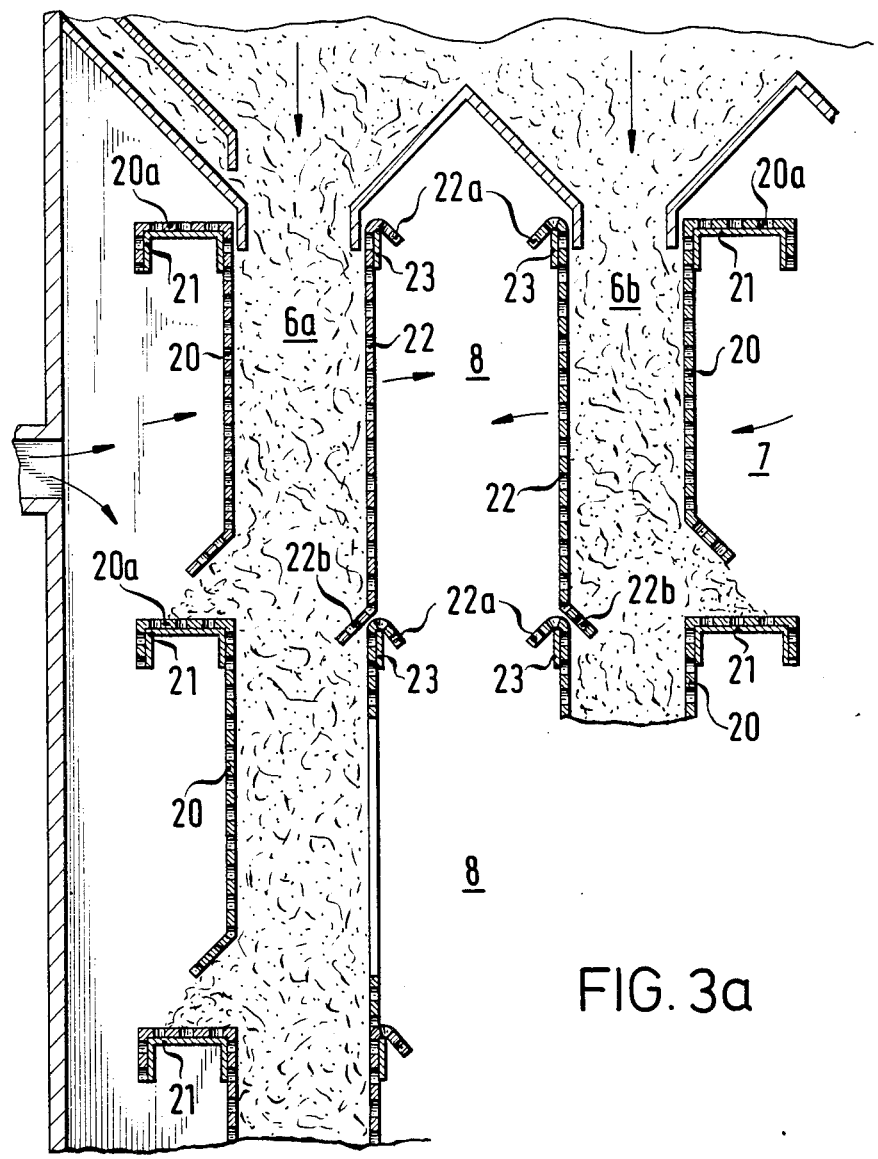
FIG. 3a is a fragmentary vertical cross-section along the line III—III of FIG. 2 with a modified structure of the delimitations of the bulk material layers and to an enlarged scale.

A particularly advantageous and uncomplicated solution is illustrated in FIG. 3a. In this case, the flow arrival side of each layer of bulk material 6a, 6b etc., comprises gas-permeable sheet metal strips 20, for example comprising perforated plates of which the top edges are flanged over as a U section 20a, and which may consequently be fixedly suspended on the extremities of bearers in the form of U sections 21. The sheet metal strips or plates 20 may be angled over along the bottom edge, for reinforcement. To this end, the distance of the bottom edge of the sheet metal strips 20 from the subjacently situated sheet metal strip is so selected that unconfined slope gradients of the bulk material may form on the U sections 20a.

According to FIG. 3a, the delimitations of the bulk material layers at the flow departure side 8 consist of gas-permeable sheet metal strips or perforated plates 22 whereof the top edge is bent over, at portions 22a having their extremities suspended on the end sides 4 and 4a via bearers 23 and, the bottom edge 22b in each case overlaps the top edge 22a of the subjacently situated sheet metal strip or plate 22 at the layer side, e.g. as an angled-over section 22b, so that the delimitations 22 cannot be tipped into the flow departure space 8. This overlap may also be specified for the sheet metal plates 20 of the flow arrival side.

The bulk material in the layers 6 may be extracted via bottom screens known per se, or laterally over the slopes by application of vibrations, for example as soon as it has been exhausted by forming deleterious substances or is excessively charged with dust; and then being reintroduced into the filter after being regenerated. It is also possible to cleanse the bulk material after considerable charging with dust or extensive adsorption of deleterious gases periodically by means of a counterflow flushing operation, to which end it may be necessary to construct the flow arrival sides of the layers in such manner that the bulk material may be extracted via the flow arrival sides.

Whilst the invention and many of its attendant advantages will be understood from the foregoing description, it will be apparent that various changes may be made in the form, construction and arrangement of the parts without departing from the spirit and scope of the invention or sacrificing all of its material advantages, the form hereinbefore described merely being a preferred embodiment.

What is claimed is:

1. A stratified bulk material filter comprising a housing having an inlet for admitting contaminated gases containing dust and smoke and an outlet for exiting purified gases, said housing having an interior filled with granular material, including a bottom collector-space within the said housing, a separation wall subdividing said housing into a contaminated gas space comprising at least one pair of upright granular material layers, the layers separated by spaced gas permeable lateral delimitation means and arranged to be traversed by a flow of the contaminated gas, and a purified gas space which is in communication via an opening in the separation wall with a flow escape space between the two spaced granular material layers of the pair, in which the gas-permeable lateral delimitation means of each granular material layer at the flow arrival and flow departure sides consist of replaceable rigid gas-permeable delimiting members supported between the separation wall and an opposite terminal wall of each granular layer, and opening means on a wall of said housing, adjacent said purified gas space, for admitting the insertion of said members in said flow escape space, of each pair of the granular material layers, bearer means for suspending said members at least at their extremities on the separation wall and said opposite terminal wall.

2. A stratified bulk material filter according to claim 1, in which the gas permeable delimitation means of the granular material layers at the flow arrival side consist of inverted channel sections spaced apart whereby the mutual spacing allows the formation of granular materials slopes on the upper web surface of the subjacent channel sections.

3. A stratified bulk material filter according to claim 1, in which the gas-permeable delimiting members at the flow arrival and departure sides of the granular material layers consist of gas-permeable sheet metal members having top edge portions turned over and suspended via bearers at the partition and of the terminal wall of the pairs of granular material layers and of which the bottom edge portions are arranged in overlapping relation with subjacent sheet metal members at the granular material side.

4. A stratified bulk material filter according to claim 1, in which the delimitations of the granular material layers of each pair of granular material layers at the flow departure side consist of channels, the channels comprising gas-permeable sidewalls which are spaced apart, and are arranged one above the other and are insertible through said opening means.

5. A stratified bulk material filter according to claim 1, in which the delimitations of the granular material layers of each pair at the flow departure side comprise a channel between gas permeable spaced walls insertible through said opening means and having upper edges suspended at their extremities on said bearer means of the partition and an opposite end wall delimiting the granular material layers.

6. A stratified bulk material filter according to claim 1, in which the gas permeable delimitation means of the granular material layers at the flow arrival side consist of gas-permeable sheet metal members of which the top edge is turned over in channel form, the channel form being suspended on inverted channel shaped bearers secured between the terminal wall of each pair and on the partition.

7. A stratified bulk material filter according to claim 6, in which the bottom edge of the gas-permeable sheet metal member at the flow arrival side has a spacing from the top edge of the subjacent sheet metal member for the forming of a granular material slope between the adjacent sheet metal members.

8. A stratified bulk material filter according to claim 6, in which the bottom edges of the sheet metal members at the flow arrival side overlap the subjacent sheet metal members at the granular material side.

* * * * *